United States Patent
Du

(10) Patent No.: US 9,857,652 B2
(45) Date of Patent: Jan. 2, 2018

(54) WIDE VIEWING ANGLE PANEL AND DISPLAY DEVICE

(71) Applicant: Shenzhen China Star Optoelectronics Technology Co., Ltd., Shenzhen, Guangdong (CN)

(72) Inventor: Peng Du, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 165 days.

(21) Appl. No.: 14/908,051

(22) PCT Filed: Dec. 30, 2015

(86) PCT No.: PCT/CN2015/099711
§ 371 (c)(1),
(2) Date: Jan. 27, 2016

(87) PCT Pub. No.: WO2017/071090
PCT Pub. Date: May 4, 2017

(65) Prior Publication Data
US 2017/0269447 A1    Sep. 21, 2017

(30) Foreign Application Priority Data
Oct. 29, 2015   (CN) .......................... 2015 1 0718519

(51) Int. Cl.
| G02F 1/1362 | (2006.01) |
| G09G 3/36   | (2006.01) |
| G09G 5/10   | (2006.01) |
| G02F 1/1368 | (2006.01) |
| G02F 1/1343 | (2006.01) |

(52) U.S. Cl.
CPC ...... *G02F 1/136286* (2013.01); *G02F 1/1368* (2013.01); *G02F 1/134309* (2013.01); *G02F 1/136213* (2013.01); *G09G 3/3607* (2013.01); *G09G 5/10* (2013.01); *G02F 2001/134345* (2013.01); *G02F 2201/121* (2013.01); *G02F 2201/123* (2013.01);
(Continued)

(58) Field of Classification Search
CPC ................... G09G 3/3607; G09G 5/10; G09G 2300/0426; G09G 2330/021
See application file for complete search history.

(56) References Cited

U.S. PATENT DOCUMENTS

| 2004/0008178 A1* | 1/2004 | Kato ................. G02F 1/133603 345/102 |
| 2005/0041188 A1* | 2/2005 | Yamazaki ......... G02F 1/134336 349/146 |
| 2007/0085862 A1* | 4/2007 | Moriya ................ G09G 3/2003 345/694 |

* cited by examiner

*Primary Examiner* — Shaheda Abdin
(74) *Attorney, Agent, or Firm* — Andrew C. Cheng

(57) ABSTRACT

The present disclosure provides a wide viewing angle panel and a display device, in each row of sub pixels of the wide viewing angle panel, every three sub pixels constitute a pixel unit, which is arranged in an array, the pixel unit includes a first pixel unit and a second pixel unit, the brightness of the first pixel unit is higher than that of the second pixel unit, the area of the first pixel unit is equal to that of the second pixel unit, the first pixel unit and the second pixel unit are uniformly disposed on the array. The display device includes the wide viewing angle panel as descripted above. The present disclosure can increase the transmittance of the wide viewing angle panel, reduce the energy consumption of backlight, and make the design of the pixel unit distribution more flexible in the wide viewing angle panel.

19 Claims, 3 Drawing Sheets

(52) U.S. Cl.
CPC .............. *G09G 2300/0426* (2013.01); *G09G 2320/0233* (2013.01); *G09G 2330/021* (2013.01)

WIDE VIEWING ANGLE PANEL AND DISPLAY DEVICE

FIELD OF THE INVENTION

The present disclosure relates to a field of liquid crystal display technology, and in particular it relates to a wide viewing angle panel and a display device.

BACKGROUND OF THE INVENTION

Vertical alignment (VA) is now commonly applied in high-end liquid crystal display, which is a wide viewing angle panel. When observing the wide viewing angle of a traditional VA mode LCD panel, color shift problem is usually occurred. For improving the color shift problem in the wide viewing angle panel, the pixel of the wide viewing angle panel is divided into two sections in the existing arts. When the panel works, one section (main section) has higher brightness, and another section (sub section) has lower brightness, the wide viewing angle characteristic of the panel is improved by adjusting the two sections with different brightness.

Because of the area of the sub section is larger (accounting for about 60% of the pixel aperture area), the transmittance of the entire pixel has a huge sacrifice, the energy consumption of backlight has increased, which does not meet the requirement of the current green energy concept. Besides, since the pixels in the main section offer high brightness, while the pixels of the sub section offer low brightness, the pixels with high brightness and low brightness are set too concentrated, respectively, so that the brightness difference between the two sections is too obvious, leading to poor visual effects.

SUMMARY OF THE INVENTION

The present disclosure provides a wide viewing angle panel and a display device, that are able to solve the problem of high energy consumption of backlight in the existing arts.

In order to solve the above problem, one technical solution of the present disclosure is: providing a wide viewing angle panel, the wide viewing angle panel comprises a plurality of scan lines parallel to each other, a plurality of data lines parallel to each other, and a plurality of sub pixels; the scan lines and the data lines are intersecting with each other, the sub pixels are arranged in an array, the sub pixels in each row and each of the scan lines are disposed at intervals, the sub pixels in each column and each of the data lines are disposed at intervals, each of the sub pixels is electrically connected to the scan line and the data line; in each row of the sub pixels, every three sub pixels constitute a pixel unit, the pixel unit is arranged in an array, the pixel unit comprises a first pixel unit and a second pixel unit, a brightness of the first pixel unit is higher than that of the second pixel unit, an area of the first pixel unit is equal to that of the second pixel unit, the first pixel unit is uniformly disposed on the array, the second pixel unit is uniformly disposed on the array.

Wherein, a ratio of the number of the first pixel unit and the number of the second pixel unit is 0.1-100.

Wherein, the sub pixels that constitute the first pixel unit are regarded a first sub pixel; the sub pixels that constitute the second pixel unit are regarded as a second sub pixel; the first sub pixel and the second sub pixel in the same row are both connected to a scan line corresponding to a row where the sub pixels are disposed; the first sub pixel and the second sub pixel in the same column are both connected to a data line corresponding to a column where the sub pixels are disposed.

Wherein, each sub pixel is connected to a first TFT, a gate of the first TFT is connected to the scan line corresponding to the sub pixel, a source of the first TFT is connected to the data line corresponding to the sub pixel, a drain of the first TFT is connected to a capacitor and further connected to a pixel electrode of the sub pixel; each of the second sub pixel is further connected to a second TFT for reducing a voltage of a pixel electrode of the second sub pixel.

Wherein, a gate of the second TFT is connected to the scan line corresponding to the sub pixels in the row where the second sub pixel is disposed, one end of a source/drain of the second TFT is connected to a pixel electrode of the second sub pixel, another end of the second TFT is connected to a common electrode corresponding to the second sub pixel.

Wherein, the gate of the second TFT is connected to a scan line corresponding to the sub pixels in a row next to the row where the second sub pixel is disposed, one end of the source/drain of the second TFT is connected to the pixel electrode of the second sub pixel, another end of the second TFT is connected to a capacitor and further connected to the common electrode corresponding to the second sub pixel.

Wherein, in each row of the pixel units, each of the first pixel unit and each of the second pixel unit are disposed at intervals, and in each column of the pixel units, each of the first pixel unit and each of the second pixel unit are disposed at intervals.

Wherein, in each row of the pixel units, at least two adjacent pixel units constitute a row pixel unit group, the row pixel unit group comprises a first row pixel unit group and a second row pixel unit group, the pixel units of the first row pixel group are regarded as the first pixel unit, the pixel units of the second row pixel unit group are regarded as the second pixel unit, the first row pixel unit group and the second row pixel unit group are disposed at intervals in each row of the pixel units; and in each column of the pixel units, at least two adjacent pixel units constitute a column pixel unit group, the column pixel unit group comprises a first column pixel unit group and a second column pixel unit group, the pixel units of the first column pixel group are regarded as the first pixel unit, the pixel units of the second column pixel unit group are regarded as the second pixel unit, the first column pixel unit group and the second column pixel unit group are disposed at intervals in each column of the pixel units.

Wherein, in the array formed by the pixel units, eight pixel units that surround each of the second pixel unit are regarded as the first pixel unit.

In order to solve the above problem, the present disclosure provides another technical solution of: providing a display device, the display device comprises the above wide viewing angle panel.

The beneficial effects of the present disclosure are: unlike the existing arts, in the present disclosure, the pixel unit of the wide viewing angle panel is divided into two sections, one section is a first pixel unit having higher brightness, another section of a second pixel unit having lower brightness. The area of the first pixel unit is equal to that of the second pixel unit, the first pixel unit and the second pixel unit are uniformed disposed on the array, so that the two pixel units are well mixed in the entire array. Thus, the color shift problem occurred in the wide viewing angle panel is solved, the characteristic of the wide viewing angle is also improved, and the transmittance of the wide viewing angle panel is increased, thereby reducing the power consumption of backlight. Furthermore, since the two pixel units are uniformly mixed, so that the visual effect would not be influenced by the distributions of the two pixel units with different brightness which are over concentrated, and the ratio of the numbers of the two pixel units can be freely adjusted to make the design more flexible.

BRIEF DESCRIPTION OF THE DRAWINGS

For a better understanding of the aforementioned content of the present disclosure, preferable embodiments are illustrated in accordance with the attached figures as follows. Apparently, the attached figures of the following description are only some embodiments of the present disclosure, to the person having ordinary skill in the art, it is able to derive other figures according to these attached figures without precondition to make creative effort.

DETAILED DESCRIPTION OF THE PREFERRED EMBODIMENTS

The following descriptions of the respective embodiments are specific embodiments capable of being implemented as illustrations of the present disclosure. Apparently, these specific embodiments are only part of the present disclosure, rather than the whole prospect. On the basis of the embodiments of the present disclosure, other embodiments derived from those ordinarily skilled in the arts whom without making creative efforts shall belong to the protection scope of the present disclosure.

Figure 1:
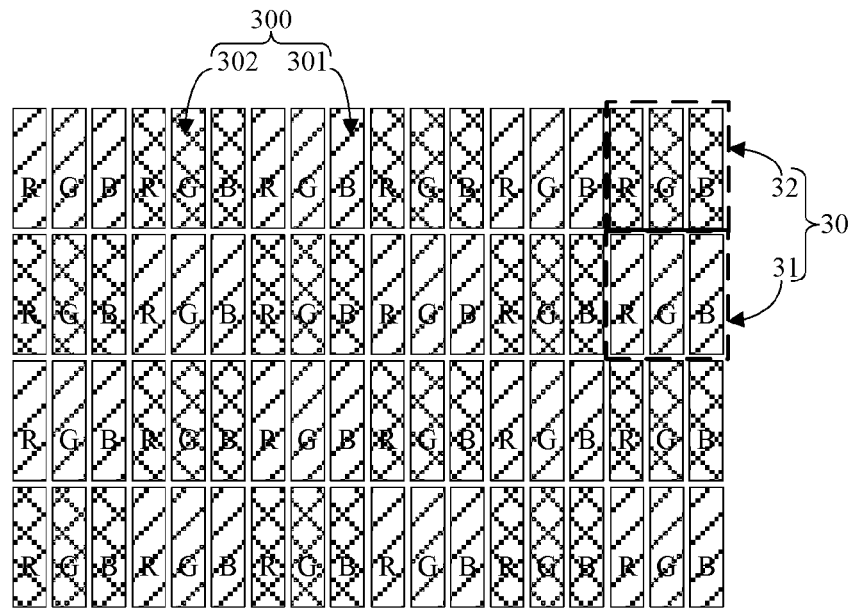
FIG. 1 is a distribution diagram of pixel units according to a first preferred embodiment of the wide viewing angle panel in the present disclosure.
Figure 4:
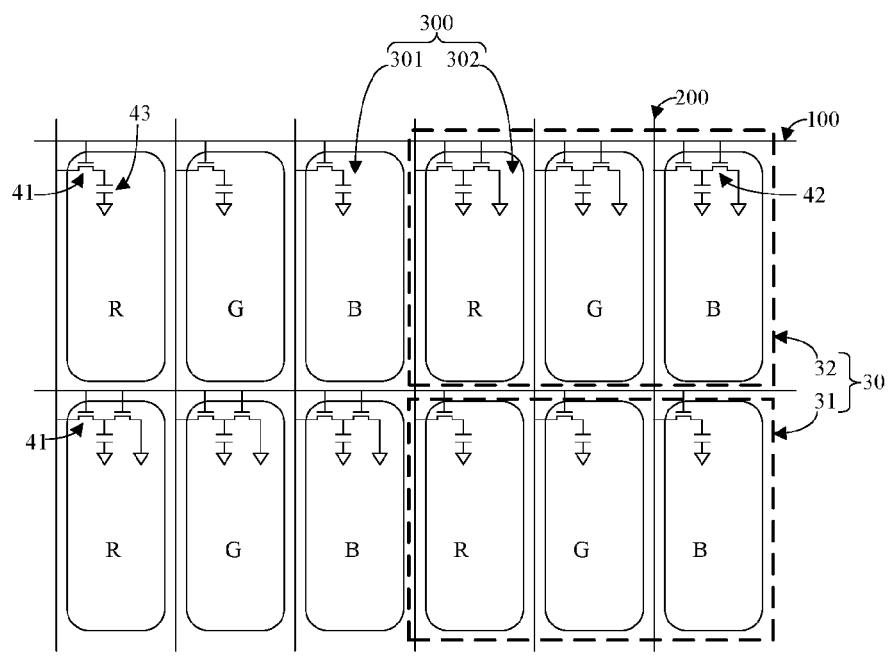
FIG. 4 is a schematic diagram of connecting structure of sub pixels, scan line, and data line according to a first preferred embodiment of the wide viewing angle panel in the present disclosure.

Please refer to FIGS. 1 and 4, FIG. 1 is a distribution diagram of pixel units according to a first preferred embodiment of the wide viewing angle panel in the present disclosure. FIG. 4 is a schematic diagram of connecting structure of sub pixels, scan line, and data line according to the first preferred embodiment of the wide viewing angle panel in the present disclosure.

The wide viewing angle panel of the present disclosure is a liquid crystal display panel, which comprises a display area and a non-display area (not shown), wherein the display area comprises a plurality of scan lines 100 parallel to each other, a plurality of data lines 200 parallel to each other, and a plurality of sub pixels 300. Each of the sub pixels 300 comprises a pixel electrode corresponding to a common electrode, a capacitor is formed between the pixel electrode and the common electrode, so as to generate an electric field to rotate the liquid crystal.

The scan lines 100 and the data lines 200 are intersecting with each other, the sub pixels 300 are arranged in an array, the sub pixels 300 in each row and each of the scan lines 100 are disposed at intervals, the sub pixels 300 in each column and each of the data lines 200 are disposed at intervals, each of the sub pixels 300 is electrically connected to the scan line 100 and the data line 200.

In the present disclosure, in each row of the sub pixels 300, every three sub pixels 300 constitute a pixel unit 30, the pixel unit 30 is arranged in an array, wherein the three sub pixels 300 that constitute a pixel unit 30 are red sub pixel (R), green sub pixel (G), and blue sub pixel (B), respectively.

Specifically, the pixel unit 30 comprises a first pixel unit 31 and a second pixel unit 32, a brightness of the first pixel unit 31 is higher than that of the second pixel unit 32, an area of each first pixel unit 31 is equal to that of the second pixel unit 32, the first pixel unit 31 is uniformly disposed on the array, the second pixel unit 32 is uniformly disposed on the array.

Unlike the existing arts, in the present disclosure, the pixel unit 30 of the wide viewing angle panel is divided into two sections, one section is the first pixel unit 31 having higher brightness, another section of the second pixel unit 32 having lower brightness. The area of each first pixel unit 31 is equal to that of the second pixel unit 32, and the first pixel unit 31 and the second pixel unit 32 are uniformed disposed on the array, so that the two pixel units 30 are well mixed in the entire array. Thus, the color shift problem occurred in the wide viewing angle panel is solved, the characteristic of the wide viewing angle is also improved, and the transmittance of the wide viewing angle panel is increased, thereby reducing the power consumption of the backlight. Furthermore, since the two pixel units 30 are uniformly mixed, so that the visual effect would not be influenced by the distributions of the two pixel units 30 with different brightness which are over concentrated, and the ratio of the number of the two pixel units 30 can be freely adjusted to make the design more flexible.

Specifically, a ratio of the number of the first pixel unit 31 and the number of the second pixel unit 32 is 0.1-100. For example, the ratio of the number of the first pixel unit 31 and the number of the second pixel unit 32 is 10-80, or the ratio of the number of the first pixel unit 31 and the number of the second pixel unit 32 is 40-70, or the ratio of the number of the first pixel unit 31 and the number of the second pixel unit 32 is 50-60.

Please further refer to FIG. 1, in the present disclosure, in each row of the pixel units, each of the first pixel units 31 and each of the second pixel units 32 are disposed at intervals, and in each column of the pixel units, each of the first pixel units 31 and each of the second units 32 are disposed at intervals. Such that, the up, down, left, and right sides of each first pixel unit 31 are all surrounded by the second pixel unit 32. Each of the second pixel unit 32 adopts same disposal, that is, the up, down, left, and right sides of each second pixel unit 32 are all surrounded by the first pixel unit 31.

By adopting this arrangement, a ratio of the number of the first pixel unit 31 and the number of the second pixel unit 32 is 1:1, the area of the first pixel unit 31 with higher brightness is increased up to 50%, thus the transmittance of the wide viewing angle panel is effectively increased, and the power consumption of backlight is therefore reduced. Furthermore, because of the first pixel unit 31 and the second pixel unit 32 are uniformly mixed, the wide viewing angle characteristic is also improved while improving the visual effect.

Figure 2:
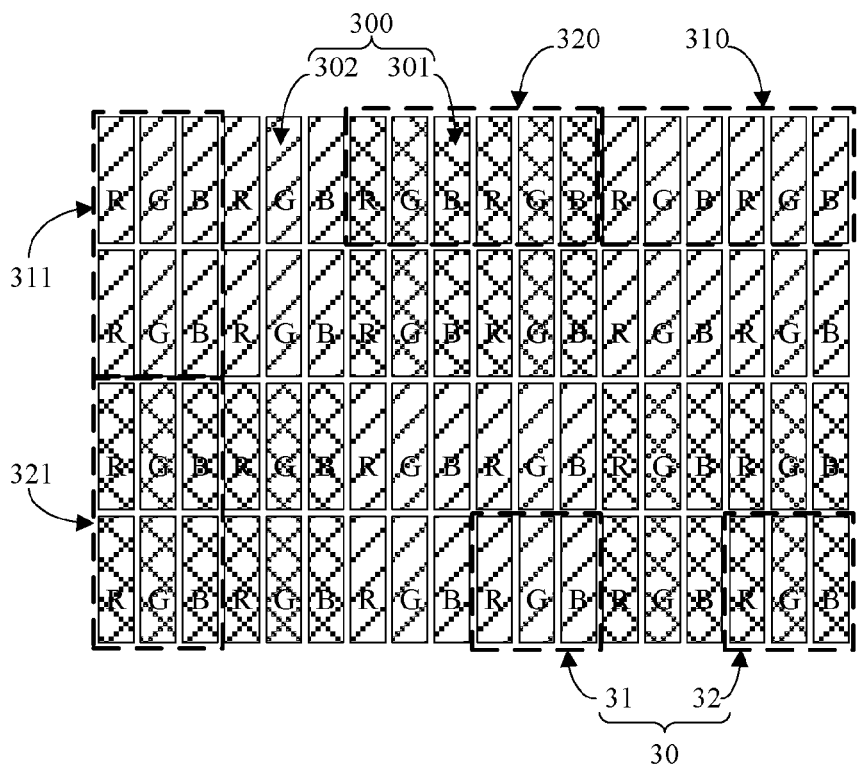
FIG. 2 is a distribution diagram of pixel units according to a second preferred embodiment of the wide viewing angle panel in the present disclosure.

Please refer to FIG. 2, which is a distribution diagram of pixel units according to a second preferred embodiment of the wide viewing angle panel in the present disclosure.

In each row of the pixel units 30, at least two adjacent pixel units 30 constitute a row pixel unit group, in the present embodiment, in each row, two adjacent pixel units 30 constitute a row pixel unit group, it should be understood that in other embodiments, the row pixel unit group can also be constituted of three adjacent pixel units 30, four adjacent pixel units 30, five adjacent pixel units 30, or more. The row pixel unit group comprises a first row pixel unit group 310 and a second row pixel unit group 320, the pixel units 30 of the first row pixel group 310 are regarded as the first pixel unit 31, the pixel units 30 of the second row pixel unit group 320 are regarded as the second pixel unit 32, the first row pixel unit group 310 and the second row pixel unit group 320 are disposed at intervals in each row of the pixel units 30. Also, in each column of the pixel units 30, at least two adjacent pixel units 30 constitute a column pixel unit group, in the present embodiment, in each column, two adjacent pixel units 30 constitute a column pixel unit group, it should be understood that in other embodiments, the column pixel unit group can also be constituted of three adjacent pixel units 30, four adjacent pixel units 30, five adjacent pixel units 30, or more. The column pixel unit group comprises a first column pixel unit group 311 and a second column pixel unit group 321, the pixel units 30 of the first column pixel group 311 are regarded as the first pixel unit 31, the pixel units 30 of the second column pixel unit group 321 are regarded as the second pixel unit 32, the first column pixel unit group 311 and the second column pixel unit group 321 are disposed at intervals in each column of the pixel units 30.

By adopting this arrangement for the pixel units 30 in the present embodiment, a ratio of the number of the first pixel unit 31 and the number of the second pixel unit 32 is also 1:1, the area of the first pixel unit 31 with higher brightness is increased up to 50%, thus the transmittance of the wide viewing angle panel is effectively increased, and the power consumption of backlight is therefore reduced. Furthermore, in each row, the first row pixel unit group 310 and the second row pixel unit group 320 are disposed at intervals, and in each column, the first column pixel unit group 311 and the second column pixel unit group 321 are disposed at intervals, such that the first pixel unit 31 and the second pixel unit 32 are uniformly disposed on the array, the wide viewing angle characteristic and the visual effect are therefore improved.

Figure 3:
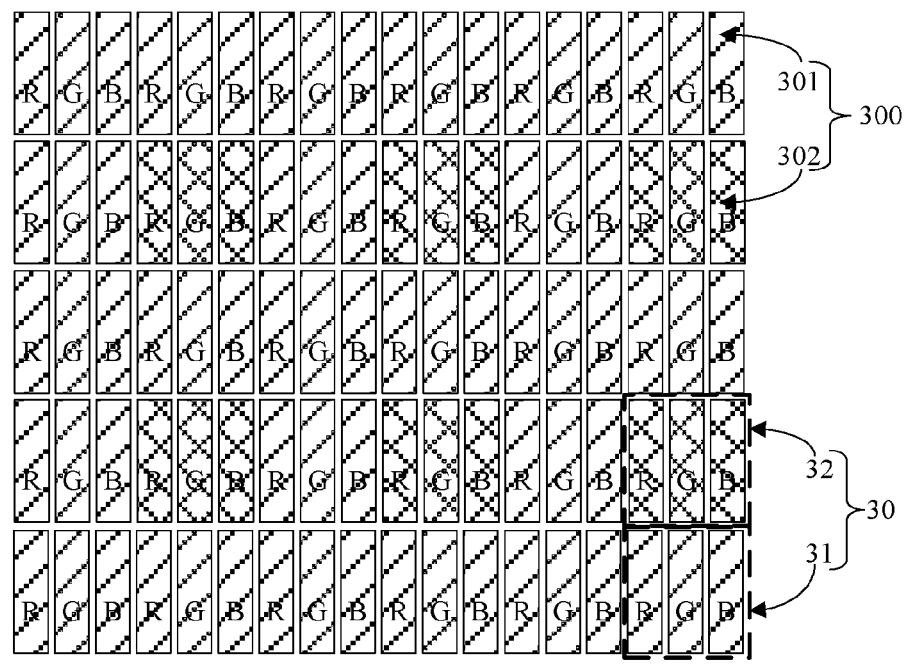
FIG. 3 is a distribution diagram of pixel units according to a third preferred embodiment of the wide viewing angle panel in the present disclosure.

Please refer to FIG. 3, which is a distribution diagram of pixel units according to a third preferred embodiment of the wide viewing angle panel in the present disclosure.

In the present disclosure, a ratio of the number of the first pixel unit 31 and the number of the second pixel unit 32 is 3:1, that is, the area of the first pixel unit 31 with higher brightness is increased up to 75%, the rest of 25% of the area is the second pixel unit 32, for improving the wide viewing angle characteristic of the panel. Thus, the present embodiment is able to increase the transmittance of the panel, as well as to reduce the energy consumption of backlight. Besides, since the distributions of the first pixel unit 31 and the second pixel unit 32 are not over concentrated, a better visual effect is therefore obtained.

Please refer the FIG. 4, which is a schematic diagram of connecting structure of sub pixels, scan line, and data line according to a first preferred embodiment of the wide viewing angle panel in the present disclosure.

In the wide viewing angle panel of the present disclosure, the sub pixels 300 that the constitute the first pixel unit 31 are regarded a first sub pixel 301; the sub pixels 300 that constitute the second pixel unit 32 are regarded as a second sub pixel 302.

In the present embodiment, the first sub pixel 301 and the second sub pixel 302 are both input the same gray scale signal, however, the brightness of the first sub pixel 301 is higher than that of the second unit pixel 302.

Specifically, the first sub pixel 301 and the second sub pixel 302 in the same row of the sub pixels 300 are both connected to a scan line 100 corresponding to a row where the sub pixels 300 are disposed. The first sub pixel 301 and the second sub pixel 302 in the same column of the sub pixels 300 are both connected to a data line 200 corresponding to a column where the sub pixels 300 are disposed. That is, the sub pixels in each row are all connected to the same scan line 100, and the scan line 100 is a scan line adjacent to the sub pixels 300; the sub pixels 300 in each column are all connected to the same data line 200, and the data line 200 is a data line adjacent to the sub pixels 300.

The above description are just some embodiments of the pixel unit 30 shown in the wide viewing angle panel of the present disclosure. As long as the first pixel unit 31 and the second pixel unit 32 can be uniformly mixed in the array, the present disclosure is not limited to the above descripted embodiments.

To achieve different brightness for the pixel units that input the same gray scale signal, the method is implemented as follows:

Each sub pixel 300 of the present disclosure is connected to a first TFT 41, a gate of the first TFT 41 is connected to the scan line 100 corresponding to the sub pixel 300, a source of the first TFT 41 is connected to the data line 200 corresponding to the sub pixel 300, a drain of the first TFT 41 is connected to a capacitor 43 and further connected to a pixel electrode of the sub pixel 300.

Each of the second sub pixel 302 is further connected to a second TFT 42 for reducing a voltage of a pixel electrode of the second sub pixel 302.

Please further refer to FIG. 4, in the present embodiment, a gate of the second TFT 42 is connected to the scan line 100 corresponding to the row where the second sub pixel 302 is disposed, one end of a source/drain of the second TFT 42 is connected to a pixel electrode of the second sub pixel, another end of the second TFT is connected to a common electrode corresponding to the second sub pixel.

After the second TFT 42 is connected to the common electrode, the common electrode plays the role of a voltage divider, so that the potential of the pixel electrode of the second sub pixel 302 is more close to that of the common electrode, thereby reducing the brightness of the second sub pixel 302.

Figure 5:
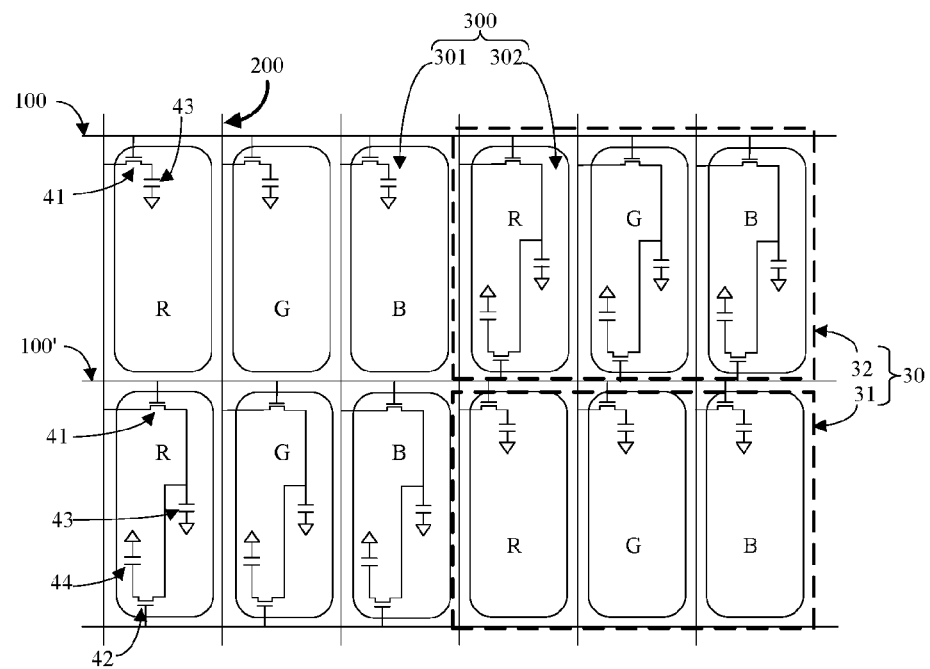
FIG. 5 is a schematic diagram of connecting structures of sub pixels, scan line, and data line according to a second preferred embodiment of the wide viewing angle panel in the present disclosure.

Please refer to FIG. 5, which is a schematic diagram of connecting structures of sub pixels, scan line, and data line according to a second preferred embodiment of the wide viewing angle panel in the present disclosure.

In the present embodiments, the gate of the second TFT 42 is connected to a scan line 100' corresponding to the sub pixels 300 in a row next to the row where the second sub pixel 302 is disposed, one end of the source/drain of the second TFT 42 is connected to the pixel electrode of the second sub pixel 302, another end of the second TFT is connected to a capacitor 44 and further connected to the common electrode corresponding to the second sub pixel.

In the present embodiments, when the panel works, the scan line 100 corresponding to the row of the sub pixels 300 is turned on, the sub pixels 300 in the row are charged normally. After they finished charging, the scan line 100' corresponding to the next row of the sub pixels 300 is turned on, the pixel electrode of the sub pixel 300 in the last row and the capacitor 44 are connected, the potential of the pixel electrode is more close to that of the common electrode through a capacitive coupling effect, such that the brightness of the second sub pixel 302 of the sub pixels 300 in the row is reduced.

Figure 6:
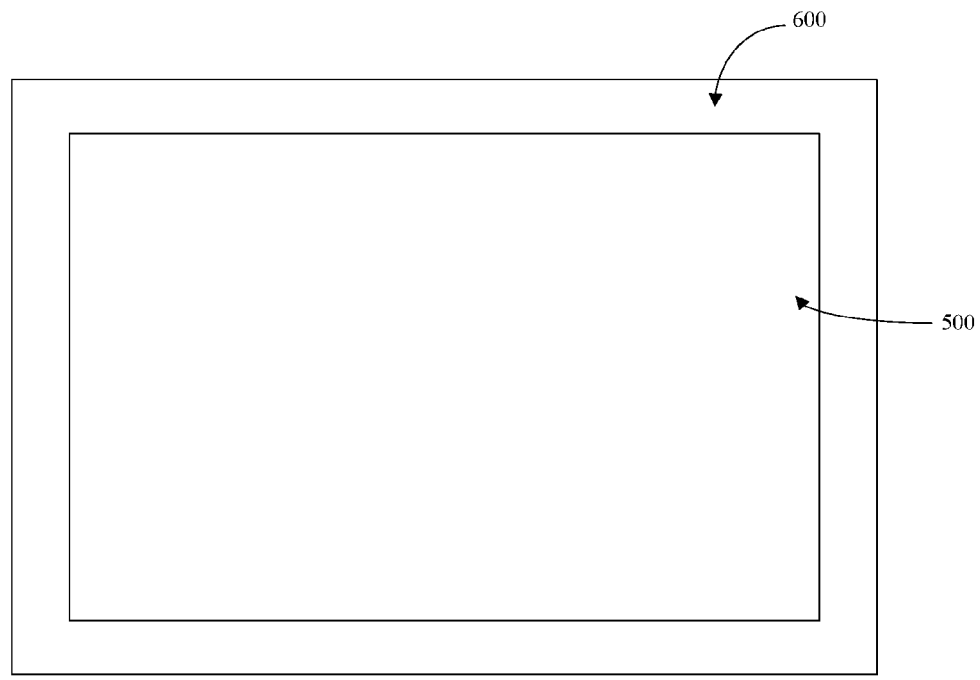
FIG. 6 is a schematic diagram of a display device structure of the present disclosure.

The present disclosure further provides a display device. Please refer to FIG. 6, which is a schematic diagram of a display device structure of the present disclosure. The display device comprises any one of the wide viewing angle panels 500 descripted in the above embodiments, and an outer case 600 disposed outside the wide viewing angle panel.

The connecting method for the first sub pixel 301, the second sub pixel 302, the scan line 100, and the data line 200 in the present disclosure including but not limit to the above two embodiments, it also includes many other connecting methods for making brightness difference between the first sub pixel 301 and the second sub pixel 302 while inputting the same gray scale signal.

The present disclosure not only can improve the color shift problem of the wide viewing angle panel, but also can improve the characteristic of wide viewing angle, and increase the transmittance of the wide viewing angle panel, the energy consumption of backlight is therefore reduced. Furthermore, the present disclosure can also lead to a better visual effect, and make the design of the pixel unit distribution more flexible.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A wide viewing angle panel, which comprises a plurality of scan lines parallel to each other, a plurality of data lines parallel to each other, and a plurality of sub pixels;

the scan lines and the data lines are intersecting with each other, the sub pixels are arranged in an array, the sub pixels in each row and each of the scan lines are disposed at intervals, the sub pixels in each column and each of the data lines are disposed at intervals, each of the sub pixels is electrically connected to the scan line and the data line;

in each row of the sub pixels, every three sub pixels constitute a pixel unit, the pixel unit is arranged in an array, the pixel unit comprises a first pixel unit and a second pixel unit, a brightness of the first pixel unit is higher than that of the second pixel unit, an area of the first pixel unit is equal to that of the second pixel unit, the first pixel unit is uniformly disposed on the array, the second pixel unit is uniformly disposed on the array;

wherein, a ratio of the number of the first pixel unit and the number of the second pixel unit is 0.1-100; the sub pixels that constitute the first pixel unit are regarded a first sub pixel; the sub pixels that constitute the second pixel unit are regarded as a second sub pixel; the first sub pixel and the second sub pixel in the same row are both connected to a scan line corresponding to a row where the sub pixels are disposed; the first sub pixel and the second sub pixel in the same column are both connected to a data line corresponding to a column where the sub pixels are disposed; each sub pixel is connected to a first TFT, a gate of the first TFT is connected to the scan line corresponding to the sub pixel, a source of the first TFT is connected to the data line corresponding to the sub pixel, a drain of the first TFT is connected to a capacitor and further connected to a pixel electrode of the sub pixel; each of the second sub pixel is further connected to a second TFT for reducing a voltage of a pixel electrode of the second sub pixel; in each row of the pixel units, each of the first pixel unit and each of the second pixel unit are disposed at intervals, and in each column of the pixel units, each of the first pixel unit and each of the second pixel unit are disposed at intervals.

2. A wide viewing angle panel, which comprises a plurality of scan lines parallel to each other, a plurality of data lines parallel to each other, and a plurality of sub pixels;

the scan lines and the data lines are intersecting with each other, the sub pixels are arranged in an array, the sub pixels in each row and each of the scan lines are disposed at intervals, the sub pixels in each column and each of the data lines are disposed at intervals, each of the sub pixels is electrically connected to the scan line and the data line;

in each row of the sub pixels, every three sub pixels constitute a pixel unit, the pixel unit is arranged in an array, the pixel unit comprises a first pixel unit and a second pixel unit, a brightness of the first pixel unit is higher than that of the second pixel unit, an area of the first pixel unit is equal to that of the second pixel unit, the first pixel unit is uniformly disposed on the array, the second pixel unit is uniformly disposed on the array.

3. The wide viewing angle panel as claimed in claim 2, wherein a ratio of the number of the first pixel unit and the number of the second pixel unit is 0.1-100.

4. The wide viewing angle panel as claimed in claim 3, wherein the sub pixels that constitute the first pixel unit are regarded a first sub pixel;

the sub pixels that constitute the second pixel unit are regarded as a second sub pixel;

the first sub pixel and the second sub pixel in the same row are both connected to a scan line corresponding to a row where the sub pixels are disposed;

the first sub pixel and the second sub pixel in the same column are both connected to a data line corresponding to a column where the sub pixels are disposed.

5. The wide viewing angle panel as claimed in claim 4, wherein each sub pixel is connected to a first TFT, a gate of the first TFT is connected to the scan line corresponding to the sub pixel, a source of the first TFT is connected to the data line corresponding to the sub pixel, a drain of the first TFT is connected to a capacitor and further connected to a pixel electrode of the sub pixel; each of the second sub pixel is further connected to a second TFT for reducing a voltage of a pixel electrode of the second sub pixel.

6. The wide viewing angle panel as claimed in claim 5, wherein a gate of the second TFT is connected to the scan line corresponding to the sub pixels in the row where the second sub pixel is disposed, one end of a source/drain of the second TFT is connected to a pixel electrode of the second sub pixel, another end of the second TFT is connected to a common electrode corresponding to the second sub pixel.

7. The wide viewing angle panel as claimed in claim 5, wherein the gate of the second TFT is connected to a scan line corresponding to the sub pixels in a row next to the row where the second sub pixel is disposed, one end of the source/drain of the second TFT is connected to the pixel electrode of the second sub pixel, another end of the second TFT is connected to a capacitor and further connected to the common electrode corresponding to the second sub pixel.

8. The wide viewing angle panel as claimed in claim 4, wherein in each row of the pixel units, each of the first pixel unit and each of the second pixel unit are disposed at intervals, and in each column of the pixel unit, each of the first pixel unit and each of the second pixel unit are disposed at intervals.

9. The wide viewing angle panel as claimed in claim 4, wherein in each row of the pixel units, at least two adjacent pixel units constitute a row pixel unit group, the row pixel unit group comprises a first row pixel unit group and a second row pixel unit group, the pixel units of the first row pixel group are regarded as the first pixel unit, the pixel units of the second row pixel unit group are regarded as the second pixel unit, the first row pixel unit group and the second row pixel unit group are disposed at intervals in each row of the pixel units; and in each column of the pixel units, at least two adjacent pixel units constitute a column pixel unit group, the column pixel unit group comprises a first column pixel unit group and a second column pixel unit group, the pixel units of the first column pixel group are regarded as the first pixel unit, the pixel units of the second column pixel unit group are regarded as the second pixel unit, the first column pixel unit group and the second column pixel unit group are disposed at intervals in each column of the pixel units.

10. The wide viewing angle panel as claimed in claim 4, wherein in the array formed by the pixel units, eight pixel units that surround each of the second pixel unit are regarded as the first pixel unit.

11. A display device, wherein the display device comprises a wide viewing angle panel, the wide viewing angle panel comprises a plurality of scan lines parallel to each other, a plurality of data lines parallel to each other, and a plurality of sub pixels;
the scan lines and the data lines are intersecting with each other, the sub pixels are arranged in an array, the sub pixels in each row and each of the scan lines are disposed at intervals, the sub pixels in each column and each of the data lines are disposed at intervals, each of the sub pixels is electrically connected to the scan line and the data line;
in each row of the sub pixels, every three sub pixels constitute a pixel unit, the pixel unit is arranged in an array, the pixel unit comprises a first pixel unit and a second pixel unit, a brightness of the first pixel unit is higher than that of the second pixel unit, an area of the first pixel unit is equal to that of the second pixel unit, the first pixel unit is uniformly disposed on the array, the second pixel unit is uniformly disposed on the array.

12. The display device as claimed in claim 11, wherein a ratio of the number of the first pixel unit and the number of the second pixel unit is 0.1-100.

13. The display device as claimed in claim 12, wherein the sub pixels that constitute the first pixel unit are regarded a first sub pixel; the sub pixels that constitute the second pixel unit are regarded as a second sub pixel; the first sub pixel and the second sub pixel in the same row are both connected to a scan line corresponding to a row where the sub pixels are disposed; the first sub pixel and the second sub pixel in the same column are both connected to a data line corresponding to a column where the sub pixels are disposed.

14. The display device as claimed in claim 13, wherein each sub pixel is connected to a first TFT, a gate of the first TFT is connected to the scan line corresponding to the sub pixel, a source of the first TFT is connected to the data line corresponding to the sub pixel, a drain of the first TFT is connected to a capacitor and further connected to a pixel electrode of the sub pixel; each of the second sub pixel is further connected to a second TFT for reducing a voltage of a pixel electrode of the second sub pixel.

15. The display device as claimed in claim 14, wherein a gate of the second TFT is connected to the scan line corresponding to the sub pixels in the row where the second sub pixel is disposed, one end of a source/drain of the second TFT is connected to a pixel electrode of the second sub pixel, another end of the second TFT is connected to a common electrode corresponding to the second sub pixel.

16. The display device as claimed in claim 14, wherein the gate of the second TFT is connected to a scan line corresponding to the sub pixels in a row next to the row where the second sub pixel is disposed, one end of the source/drain of the second TFT is connected to the pixel electrode of the second sub pixel, another end of the second TFT is connected to a capacitor and further connected to the common electrode corresponding to the second sub pixel.

17. The display device as claimed in claim 13, wherein in each row of the pixel units, each of the first pixel unit and each of the second pixel unit are disposed at intervals, and in each column of the pixel units, each of the first pixel unit and each of the second pixel unit are disposed at intervals.

18. The display device as claimed in claim 13, wherein in each row of the pixel units, at least two adjacent pixel units constitute a row pixel unit group, the row pixel unit group comprises a first row pixel unit group and a second row pixel unit group, the pixel units of the first row pixel group are regarded as the first pixel unit, the pixel units of the second row pixel unit group are regarded as the second pixel unit, the first row pixel unit group and the second row pixel unit group are disposed at intervals in each row of the pixel units; and in each column of the pixel units, at least two adjacent pixel units constitute a column pixel unit group, the column pixel unit group comprises a first column pixel unit group and a second column pixel unit group, the pixel units of the first column pixel group are regarded as the first pixel unit, the pixel units of the second column pixel unit group are regarded as the second pixel unit, the first column pixel unit group and the second column pixel unit group are disposed at intervals in each column of the pixel units.

19. The display device as claimed in claim 13, wherein in the array formed by the pixel units, eight pixel units that surround each of the second pixel unit are regarded as the first pixel unit.

* * * * *